United States Patent
Darbandi et al.

(10) Patent No.: US 11,155,168 B2
(45) Date of Patent: Oct. 26, 2021

(54) STORAGE DEVICE FOR STORING ELECTRICAL ENERGY, IN PARTICULAR FOR A MOTOR VEHICLE, MOTOR VEHICLE COMPRISING SUCH A STORAGE DEVICE, AND METHOD FOR OPERATING SUCH A STORAGE DEVICE

(71) Applicant: Bayerische Motoren Werke Aktiengesellschaft, Munich (DE)

(72) Inventors: Azad Darbandi, Unterfoehring (DE); Juergen Hildinger, Hoehenkirchen-Siegertsbrunn (DE); Florian Schoewel, Munich (DE); Wladislaw Waag, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 110 days.

(21) Appl. No.: 16/692,008

(22) Filed: Nov. 22, 2019

(65) Prior Publication Data

US 2020/0091481 A1 Mar. 19, 2020

Related U.S. Application Data

(63) Continuation of application No. PCT/EP2018/063239, filed on May 18, 2018.

(30) Foreign Application Priority Data

May 24, 2017 (DE) .................. 10 2017 208 842.7

(51) Int. Cl.
*H01M 50/342* (2021.01)
*H01M 50/578* (2021.01)
(Continued)

(52) U.S. Cl.
CPC ............ *B60L 3/0046* (2013.01); *B60R 16/04* (2013.01); *H01M 50/342* (2021.01);
(Continued)

(58) Field of Classification Search
CPC .... H01M 50/10; H01M 50/20; H01M 50/581; H01M 50/578
See application file for complete search history.

(56) References Cited

U.S. PATENT DOCUMENTS

| 6,139,986 A * | 10/2000 | Kurokawa | H01M 50/572 429/61 |
| 2002/0051904 A1 * | 5/2002 | Itoh | H01M 10/0413 429/149 |

(Continued)

FOREIGN PATENT DOCUMENTS

| DE | 10 2012 213 100 A1 | 1/2014 |
| DE | 10 2013 204 534 A1 | 9/2014 |

(Continued)

OTHER PUBLICATIONS

International Search Report (PCT/ISA/210) issued in PCT Application No. PCT/EP2018/063239 dated Sep. 25, 2018 with English translation (seven (7) pages).

(Continued)

*Primary Examiner* — Kenneth J Douyette
(74) *Attorney, Agent, or Firm* — Crowell & Moring LLP

(57) ABSTRACT

A storage device for storing electrical energy includes at least one storage cell which has a cell housing, a receiving chamber delimited by the cell housing, and at least one storage element accommodated in the receiving chamber for storing electrical energy, as well as a safety apparatus. The safety apparatus has a separating device as a first safety device designed to separate at least the storage cell from a circuit of the storage device, a short-circuit device as a (Continued)

second safety device designed to short-circuit at least the storage cell, and a degassing unit as a third safety device designed to degas the receiving chamber. The safety devices are designed to successively switch from a deactivated state into an activated state during a critical variation of the condition of the storage cell.

9 Claims, 5 Drawing Sheets

(51) Int. Cl.
*H01M 50/20* (2021.01)
*H01M 50/581* (2021.01)
*B60L 3/00* (2019.01)
*B60R 16/04* (2006.01)

(52) U.S. Cl.
CPC ....... *H01M 50/578* (2021.01); *H01M 50/581* (2021.01); *H01M 2200/103* (2013.01); *H01M 2200/20* (2013.01); *H01M 2220/20* (2013.01)

(56) References Cited

U.S. PATENT DOCUMENTS

| 2012/0313560 A1 | 12/2012 | Hambitzer et al. |
| 2014/0170450 A1 | 6/2014 | Takahashi et al. |
| 2015/0207133 A1 | 7/2015 | Holl et al. |
| 2015/0236333 A1* | 8/2015 | Guen .................. H01M 50/147 429/61 |
| 2016/0329550 A1 | 11/2016 | Kohlberger |

FOREIGN PATENT DOCUMENTS

| DE | 10 2014 200 202 A1 | 7/2015 |
| EP | 2 284 932 A1 | 2/2011 |
| EP | 2 672 548 A1 | 12/2013 |
| EP | 2 908 359 A1 | 8/2015 |
| WO | WO 2011/095630 A1 | 8/2011 |

OTHER PUBLICATIONS

German-language Written Opinion (PCT/ISA/237) issued in PCT Application No. PCT/EP2018/063239 dated Sep. 25, 2018 (11 pages).

German-language Search Report issued in counterpart German Application No. 10 2017 208 842.7 dated Jan. 18, 2018 with partial English translation (10 pages).

German-language Office Action issued in counterpart German Application No. 10 2017 208 842.7 dated Nov. 15, 2018 (six (6) pages).

* cited by examiner

STORAGE DEVICE FOR STORING ELECTRICAL ENERGY, IN PARTICULAR FOR A MOTOR VEHICLE, MOTOR VEHICLE COMPRISING SUCH A STORAGE DEVICE, AND METHOD FOR OPERATING SUCH A STORAGE DEVICE

CROSS REFERENCE TO RELATED APPLICATIONS

This application is a continuation of PCT International Application No. PCT/EP2018/063239, filed May 18, 2018, which claims priority under 35 U.S.C. § 119 from German Patent Application No. 10 2017 208 842.7, filed May 24, 2017, the entire disclosures of which are herein expressly incorporated by reference.

BACKGROUND AND SUMMARY OF THE INVENTION

The invention relates to a storage device for storing electrical energy, in particular for a motor vehicle. Further, the invention relates to a motor vehicle with at least one such storage device. The invention also relates to a method for operating such a storage device.

A storage device for storing electrical energy as well as a method for operating such a storage device are already available from DE 10 2013 204 534 A1, for example. The storage device comprises at least one storage cell, which comprises a cell housing and a receiving chamber delimited by the cell housing. In addition, the storage cell comprises at least one storage element accommodated in the receiving chamber for storing electrical energy. The storage cell is designed, for example, as a battery cell, so that the storage device is designed as a battery, for example, in particular as a high-voltage battery (HV battery). In addition, a safety apparatus of the storage device is provided. The safety apparatus is activated as part of the method for operating the storage device. By activating the safety device, for example, an undesirable, critical state of the storage device can be avoided, or such a critical state can be counteracted, so that, for example, undesirable effects resulting from the critical state can be avoided or kept within a small range.

Furthermore, WO 2011/095630 A1 discloses a high-current battery system in which a high battery current flows, especially for vehicle drives. In this case, battery system monitoring electronics and a plurality of battery modules are provided, each of which includes at least one rechargeable battery cell. The battery modules are electrically connected in series by way of an operating current line in such a way that an operating current flows through the battery current line in operation.

The object of the present invention is to create a storage device, a motor vehicle and a method of the type mentioned above, so that particularly safe operation can be achieved in a particularly cost-effective manner.

A first aspect of the invention relates to a storage device for storing electrical energy or electric current, in particular for a motor vehicle such as an automobile. The storage device comprises at least one storage cell, which comprises a cell housing and a receiving chamber delimited by the cell housing. In addition, the storage cell comprises at least one storage element for storing electrical energy accommodated in the receiving chamber. The storage element includes, for example, a liquid electrolyte in particular and/or at least one electrode and/or an electrode coil, i.e. at least one winding. In addition, the storage device includes an activatable safety apparatus by means of which, for example, by activating the safety apparatus an undesirable critical state of the storage cell can be avoided or such a critical state can be counteracted.

In order to be able to achieve particularly safe operation in a particularly cost-effective manner, the safety apparatus comprises at least three safety devices. A first safety device is designed as a separating device, by means of which at least the storage cell can be separated from a circuit of the storage device, in particular galvanically separated. By disconnecting the storage cell from the circuit, an electrical connection between the circuit and the storage cell is interrupted, so that the storage cell is no longer electrically connected to the circuit.

A second of the safety devices is designed as a short-circuit device, by means of which a short circuit of at least the storage cell can be brought about or set up. The short circuit that can be caused by means of the short-circuit device is preferably an external short circuit, which is also referred to as a short-circuit external to the storage cell. The external short circuit is not or will not be brought about within the storage cell or the cell housing by means of the short-circuit device but is or can be brought about outside the storage cell or the cell housing.

The third safety device is designed as a degassing device, which is also referred to as a degassing unit. The receiving chamber can be degassed by means of the degassing device. This is to be understood in particular to mean that by means of the degassing device a fluid, in particular a gas, can be dissipated from the receiving chamber and thus from the cell housing and thereby to the surroundings of the cell housing, in order for example to avoid excessive internal pressure prevailing in the receiving chamber.

Furthermore, it is provided according to the invention that the safety devices are designed to successively transition from a respective deactivated state to a respective activated state during a critical variation of the condition of the storage cell. In the context of or during the critical variation of the condition, for example, the storage cell changes the state thereof in such a way that in the course of this change of state of the storage cell the security devices are activated successively, i.e. consecutively. Consequently, the safety devices are successively activated in particular by the or as a result of the change in the state of the storage cell.

The critical variation of the condition is to be understood in particular to mean that during the critical variation of the condition at least one parameter characterizing the storage cell, in particular the operation or state thereof, lies outside a normal range characterizing normal operation of the storage cell, wherein the parameter is, for example, further and further away from the normal range during the critical variation of the condition. The parameter is, for example, the aforementioned internal pressure, which, for example, increases further and further during the critical variation of the condition and thus moves further and further away from its normal range.

In the deactivated state of the separating device, the storage cell is electrically connected to the circuit. If the separating device now passes from the deactivated state to the activated state, the storage cell is disconnected from the circuit by means of the separating device, so that in the activated state of the separating device the storage cell is disconnected from the circuit, in particular by means of the separating device.

In the deactivated state of the short-circuit device, no short circuit, in particular no external short circuit, of the storage cell is brought about by means of the short-circuit device. If the short-circuit device changes from the deactivated state to the activated state, the aforementioned short-circuit, in particular the external short circuit, of the storage cell is brought about by means of the short-circuit device, so that a short circuit of the storage cell, in particular an external short-circuit, is set up or brought about in the activated state of the short-circuit device, in particular by means of the short-circuit device.

In the deactivated state of the degassing device, degassing of the cell housing or the receiving chamber caused by the degassing device is stopped. If the degassing device passes from the deactivated state to the activated state, the cell housing or the receiving chamber is degassed by means of the degassing device. In the context of this degassing, a fluid, in particular a gas, is discharged from the receiving chamber by means of the degassing device, in particular to the surroundings of the cell housing, wherein the gas is, for example, a hot gas or a flow of hot gas. Thus, in the activated state of the degassing device the receiving chamber is degassed by means of the degassing device. If the degassing device, for example, passes from the deactivated state to the activated state, the degas sing device releases at least one outlet opening. In the deactivated state of the degassing device, the outlet opening is closed so that the receiving chamber is not degassed via the outlet opening. In the activated state of the degassing device, however, the outlet opening is opened, so that the receiving chamber is degassed via the outlet opening. Via the outlet opening, at least part of the fluid initially accommodated in the receiving chamber can flow out of the receiving chamber and thereby, for example, to the surroundings of the cell housing, whereby, for example, the aforementioned internal pressure can be at least partially reduced. By activating the respective safety device, the safety apparatus is activated in its entirety.

The critical variation of the condition is caused, for example, by a thermal event in the storage cell or in the storage device. In other words, for example, the storage cell is changed from the previous normal operation into the critical state by a thermal event, so that the storage cell is in a critical state due to the thermal event. The thermal event results, for example, from an accidental exposure to force and leads to warming or heating of the storage cell. The aforementioned fluid, which can be discharged from the receiving chamber by means of the degassing device, results, for example, from such a thermal event and arises from the aforementioned, in particular liquid, electrolytes, for example.

Since the safety devices are activated in a time sequence or change from the respective deactivated state to the respective activated state, a temporal switching series or an activation series is provided during which the safety devices are successively activated in a targeted or defined sequence. This can, for example, de-escalate a thermal event in the storage cell, which may be designed as a battery cell for example, so that, for example, an early escape of fire and flame from the storage cell, in particular from the storage device as a whole, can be avoided. By means of the targeted or defined time-sequential activation of the safety devices, a multi-stage, in particular at least three-stage, safety concept can be achieved, so that, for example, it is possible to prevent fire and/or flames from escaping or emanating from the storage device over a particularly long period of time. This can, for example, ensure a particularly high level of safety for occupants of the motor vehicle. In particular, it is possible to avoid thermal propagation in the storage device by successively activating the safety device. In the context of such a thermal propagation, for example, if one storage cell in the storage device enters a critical state, at least one other, in particular adjacent storage cell of the storage device—although it itself has not entered the critical state—is changed to a critical state by the first storage cell and thus begins to burn. Thus, for example, the thermal event of the first storage cell leads to an undesirable thermal event of the other adjacent storage cell, which can now be avoided by the multi-stage safety concept.

Preferably, the safety device is arranged on, in particular at least partially in, the storage cell and is thus provided at the cell level, so that the safety concept can be implemented particularly cost-effectively and effectively compared to safety measures provided at the storage level.

In an advantageous embodiment of the invention, the safety device is designed such that during the critical variation of the condition first the separating device, then the short-circuit device and then the degassing device changes from the respective deactivated state to the respective activated state. Preferably, the separating device remains in the activated state when the short-circuit device enters the activated state. Further, the separating device and the short-circuit device remain or are preferably in the respective activated states thereof when the degassing device changes into the activated state. By activating the separating device, the storage cell is disconnected from the circuit, also known as the storage circuit, in good time. The short-circuit device is activated only after the separating device and ensures that the storage cell is short-circuited, in particular externally. This has a de-escalating effect, since by means of the short circuit at least part of the energy content of the storage cell is consumed electrically, in particular by external and internal cell resistance. Furthermore, the short circuit has a de-escalating effect since the cell voltage drops considerably due to the short circuit and the release of oxygen at a surface of cathode material is greatly reduced or suppressed.

Preferably, the short-circuit device maintains the short circuit, in particular for about 60 seconds, at least until the degassing device is activated, in particular due to the further increasing internal pressure, or changes to the activated state, i.e. until the storage cell opens. During degassing, in particular during the first ten to twenty seconds of degassing, for example, at least a large part of the fluid in the form of a fuel or an electrolyte or an electrolyte solution, and thereby in the form of a fuel, is led out of or removed from the storage cell. For example, the timely external short circuit of the storage cell prevents adjacent storage cells from starting to burn. In addition, it can be avoided that fire and flame emanate from the storage device. As a result, particularly safe operation can be exhibited.

In a particularly advantageous embodiment of the invention, the respective safety device can be changed from the respective deactivated state to the respective activated state by a respective pressure prevailing in the receiving chamber. In other words, the respective change or the respective transition from the respective deactivated state to the respective activated state is caused, in particular only, by the aforementioned internal pressure prevailing in the receiving chamber, so that for example the respective safety device changes from the respective deactivated state to the respective activated state due to the pressure and thus by itself or independently or automatically. Again in other words, for example, the respective activation of the respective safety device, in particular solely and alone, is carried out due to the pressure prevailing in the receiving chamber and acting on the respective safety device, which for example increases as the critical variation of the condition progresses.

Thus, it has been shown to be particularly advantageous if first the separating device, then the short-circuit device and then the degassing device changes from the respective deactivated state to the respective activated state with increasing pressure prevailing in the receiving chamber during the critical variation of the condition.

Particularly safe operation can be achieved by the fact that the separating device is designed to change from the deactivated state to the activated at a pressure prevailing in the receiving chamber in a range from 5.5 bar to 6.5 bar inclusive. In other words, if the internal pressure reaches a value that is in a range from 5.5 bar to 6.5 bar, then the separating device is activated by the pressure, while activation of the short-circuit device and the degassing device is inhibited.

It has been shown to be further particularly advantageous if the short-circuit device is designed to change from the deactivated state to the activated state at a pressure prevailing in the receiving chamber in a range from 7 bar to 8 bar. In other words, the internal pressure increases, for example, in such a way that the internal pressure has a value that is in a range from 7 bar to 8 bar inclusive, so the short-circuit device is activated by the pressure by which the separating device was previously activated, in particular while the separating device is still activated. In this case, it still remains to activate the degassing device.

A further embodiment is characterized in that the degassing device is designed to change from the deactivated state to the activated state at a pressure prevailing in the receiving chamber in a range from 9.5 bar to 10.5 bar. In other words, the internal pressure continues to increase, so that the internal pressure has a value that is in a range from 9.5 bar to 10.5 bar inclusive, so the degassing device is also finally activated by the pressure.

In a particularly advantageous embodiment, the short-circuit device can be changed from the deactivated state to the activated state by a temperature, in particular prevailing in the receiving chamber, in particular in the storage cell. In other words, previously embodiments were described in which a pressure-related triggering or activation of the short-circuit device is provided, for example. This is to be understood in particular to mean that, in particular only, the pressure prevailing, in particular in the receiving chamber, causes the activation of the short-circuit device. Now, however, it is preferably provided that, in particular only and solely, the activation of the short-circuit device is brought about by a temperature. Thus, for example, if a temperature of the short-circuit device exceeds a pre-set threshold, the short-circuit device changes from the deactivated state to the activated state and subsequently disconnects at least the storage cell from the circuit. This allows a particularly short reaction time to be achieved in the case of a propagated thermal event.

Finally, it has been shown to be particularly advantageous if the storage device comprises at least one further storage cell connected parallel to the storage cell for storing electrical energy, wherein the short-circuit device is designed to short circuit at least the first storage cell and the parallel connected additional storage cell. For example, the short-circuit device is activated first, while the separating device and the degassing device remain deactivated. By this activation of the short-circuit device, for example, the first storage cell and the further storage cell are short-circuited, in particular by means of the separating device. In particular, it may be provided that the storage device comprises the first storage cell and adjacent additional storage cells connected parallel to the first storage cell, wherein the first storage cell and the adjacent parallel connected storage cells are short-circuited by activating the short-circuit device, in particular by means of the separating device, in particular by means of an external short-circuit.

The separating device is preferably activated a few milliseconds, in particular not more than 100 milliseconds, after activating the short-circuit device or after causing the short circuit, in particular while the degassing device is still deactivated and/or the short-circuit device is still activated. By activating the separating device, at least the first storage cell, in particular the first storage cell and the further storage cell, is/are disconnected from the circuit. The short-circuit device maintains the short circuit, in particular for at least 60 seconds, at least until the degassing device is activated, in particular due to the further increasing internal pressure, or until the first storage cell opens.

During the degassing of at least the first storage cell caused by the degassing device, in particular during the first 10 to 20 seconds of degassing, a large part of the electrolyte solution (fuel) is removed from the first storage cell.

Preferably, the separating device includes at least one melting fuse, via which the first storage cell and the parallel connected further storage cell or the parallel connected further storage cells are short-circuited by activating the short-circuit device. Furthermore, the disconnection from the circuit can be brought about by means of the melting fuse. By using such a melting fuse, the costs can be kept particularly low, since a pressure-based device, in particular in the form of the separating device, can be replaced by the melting fuse, which is temperature-based for example. For example, the melting fuse, by means of which the short circuit is brought about, is heated by the short circuit. As a result, the melting fuse melts, which disconnects at least the first storage cell from the circuit. Furthermore, a particularly simple spatial implementation of this solution can be realized on the cathode side (+ terminal). In addition, owing to this embodiment a particularly high operating reliability of the storage cell can be exhibited, since only one pressure-based device, in particular in the form of the degassing device and/or the short-circuit device, is sufficient in the storage cell to ensure a high degree of safety.

A second aspect of the invention relates to a motor vehicle with at least one storage device according to the invention. Advantages and advantageous embodiments of the first aspect of the invention are to be regarded as advantages and advantageous embodiments of the second aspect of the invention and vice versa.

A third aspect of the invention relates to a method for operating a storage device for storing electrical energy, in particular for operating a storage device according to the invention. The storage device comprises at least one storage cell, which comprises a cell housing, a receiving chamber delimited by the cell housing and at least one storage means for storing electrical energy accommodated in the receiving chamber. In addition, the storage device, in particular the storage cell, includes a safety device, which is activated in the context of the method.

In order to be able to achieve particularly safe operation in a particularly cost-effective manner, it is provided according to the invention that the safety apparatus includes a separating device designed for disconnecting the storage cell from a circuit of the storage device as the first safety device, a short-circuit device designed for causing an in particular external short-circuit of the storage cell as a second safety device and a degassing device designed for degassing the receiving chamber as a third safety device, wherein in the context of the method the safety devices are activated successively or one after the other and thus sequentially during a critical variation of the condition of the storage cell. Advantages and advantageous embodiments of the first aspect and the second aspect of the invention are to be regarded as advantages and advantageous embodiments of the third aspect of the invention and vice versa.

It has been shown to be particularly advantageous if first the separating device, then the short-circuit device and then the degassing device are activated during the critical variation of the condition. It has been found that this order of activation of the safety devices is particularly advantageous in order to avoid or at least keep within limits an excessive propagation of a thermal event in the storage facility.

In order to be able to keep the costs particularly low as well as achieve particularly safe operation, it is provided in a further embodiment of the invention that the respective safety device is activated by a respective prevailing pressure in the receiving chamber, in particular by the fact that the pressure acts on the respective safety device. Thus, for example, an automatic or independent activation of the respective safety device is provided that is in particular brought about by the pressure alone, wherein the safety devices are thereby activated in particular sequentially, so that the pressure increases or rises during the critical variation of the condition.

Thus, it has been shown to be particularly advantageous if the increasing pressure prevailing in the receiving chamber during the critical variation of the condition first activates the separating device, then the short-circuit device and then the degassing device.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures the same or functionally identical elements are given the same reference characters.

DETAILED DESCRIPTION OF THE DRAWINGS

Figure 1:
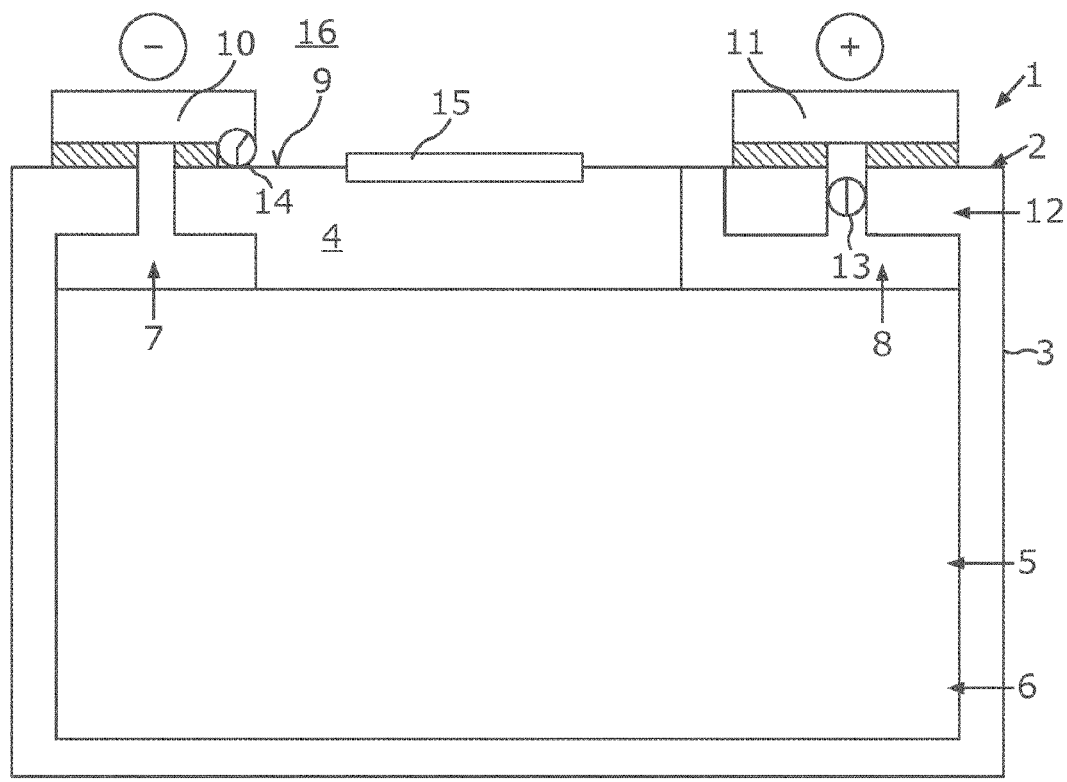
FIG. 1 is a schematic sectional view of a storage device according to the invention and according to a first embodiment that is in normal operation.

FIG. 1 shows a schematic sectional view of a storage device as claimed in a first embodiment for storing electrical energy or electric current that is denoted as a whole by 1. The storage device 1 is, for example, part of a motor vehicle, in particular an automobile and preferably a passenger car, which also includes, for example, at least one electric machine. By means of the electric machine, for example, at least one wheel of the motor vehicle or the motor vehicle as a whole can be driven electrically. For this purpose, the electric machine is operated in a motor mode and thus as an electric motor. In order to operate the electric machine in the motor mode, the electric machine is supplied with the electrical energy stored in the storage device 1.

The storage device 1 is designed, for example, as a battery, in particular as a high-voltage battery (HV battery). In other words, the storage device 1 is preferably designed as a high-voltage component, so that the storage device 1 has an electrical voltage, in particular an electrical operating voltage, which, for example, amounts to more than 50 volts, in particular more than 60 volts and preferably several 100 volts.

As a result, particularly high electrical power can be implemented for driving the motor vehicle.

The storage device 1 comprises at least one storage cell 2, which is designed, for example, as a battery cell. The storage device 1 also includes, for example, a storage housing that is not shown in the figure, in which several storage cells, in particular battery cells, are arranged. For this purpose, for example, the storage housing comprises a receiving chamber in which the multiple storage cells are arranged. The previous and subsequent comments regarding the storage cell 2 can easily be transferred to the other storage cells and vice versa. For example, the storage cells form a module, in particular a battery module.

The storage cell 2 includes a cell housing 3 and a receiving chamber 4 delimited by the cell housing 3, in which at least one storage element 5 of the storage cell 2 is arranged or accommodated. Electrical energy or electric current can be stored by means of the storage element 5. For this purpose, the storage element 5 includes, for example, at least one electrode device 6, which comprises at least one electrode and/or at least one electrode winding. The electrode winding, for example, is a coil. In particular, the coil includes, for example, a first electrode in the form of a cathode and a second electrode in the form of an anode, wherein the electrodes are, for example, rolled up or wound into the electrode winding. In particular, the storage element 5 comprises at least one separating device arranged between the electrodes. The electrode winding may comprise in particular a jelly-roll structure, i.e. may be wound or rolled up like a biscuit roll.

In addition, the storage cell 2 comprises a first electrode tongue 7, which is also referred to as flag or a small flag and which is electrically and preferably mechanically connected to the anode, for example. The electrode tongue 7 is formed, for example, from a metallic material, in particular from copper. Furthermore, the storage cell 2 comprises a second electrode tongue 8, which is also referred to as a flag or a small flag and, for example, is electrically and preferably mechanically connected to the cathode. The electrode tongue 8 is formed, for example, from a metallic material, in particular aluminum. From FIG. 1 it can be seen that the electrode tongues 7 and 8 are arranged in the receiving chamber 4.

The storage cell 2 also comprises a first connection 10 at least partially disposed on the outside 9 of the cell housing 3 facing away from receiving chamber 4 and at least electrically connected to the electrode tongue 7 and thereby forming an electrical minus (negative) pole of the storage cell 2. Furthermore, the storage cell 2 comprises a second connection 11 at least partially arranged on the outside 9 facing away from the receiving chamber 4 and at least electrically connected to the electrode tongue 8 and thereby forming an electric plus (positive) pole of the storage cell 2. The storage cells are electrically connected, for example, by means of the respective connections 10 and 11 thereof and thus, for example, in series or in parallel, whereby particularly high electrical power can be achieved for driving the motor vehicle.

In particular, the storage element 5 may include an electrolyte that is not shown in the figures in which, for example, the electrode device 6 is at least partially immersed, in particular at least predominantly or completely immersed. If, for example, a thermal event occurs in the storage cell 2, the storage cell 2, in particular the storage element 5, is heated strongly during the thermal event, for example. Such a thermal event may result, for example, from an accident of the motor vehicle and thus, for example, from an accidental application of force to the storage device 1. By heating the electrolyte, for example, a fluid emerges from the electrolyte, which can include, for example, a gas and/or a liquid, in particular an electrolyte solution. As a result of the thermal event, said fluid is released in the receiving chamber 4. The storage cell 2 includes a safety apparatus that is designated as a whole by 12 and that is activated, for example, in the context of a method for operating the storage device 1.

In order to be able to implement particularly safe operation of the storage device 1, the safety apparatus 12 comprises a first safety device in the form of a separating device 13, by means of which the storage cell 2 can be disconnected from a circuit of the storage device 1. In a normal operation shown in FIG. 1, for example, said storage cells are connected to the circuit at least electrically, so that the storage cells are electrically connected to each other via the circuit. Due to the disconnection of the storage cell 2 from the circuit that is caused by the separating device 13, the storage cell 2 is disconnected, for example, from the other storage cells, in particular electrically.

The safety apparatus 12 comprises a second safety device in the form of a short-circuit device 14, by means of which an external short circuit of the storage cell 2 can be brought about. Said external short circuit is to be understood to mean that the short circuit is not in the storage cell 2 or in the receiving chamber 4, but outside the storage cell 2 or the receiving chamber 4 and thus for example can be brought about or is brought about on the outside 9 facing away from the receiving chamber 4 by means of the short-circuit device 14.

The safety apparatus 12 also includes a third safety device in the form of a degassing device 15, which is also referred to as a degassing unit. The receiving chamber 4 can be degassed by means of the degassing device 15. Said degassing of the receiving chamber 4 is to be understood to mean that the fluid released in the receiving chamber 4 by means of or via the degassing device 15 is discharged at least partially from the receiving chamber 4 and in particular to the surroundings 16 of the storage cell 2 or the cell housing 3.

Figure 2:
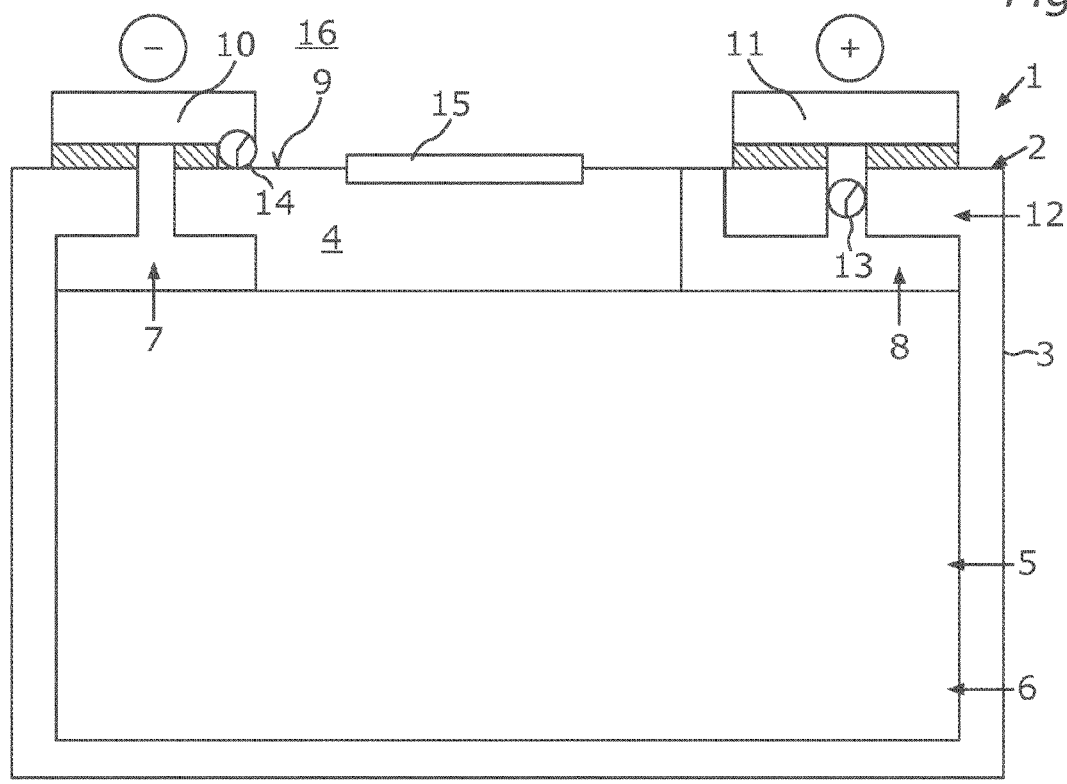
FIG. 2 is a schematic sectional view of the storage device according to the first embodiment, which is in a first state of a critical variation of the condition.
Figure 3:
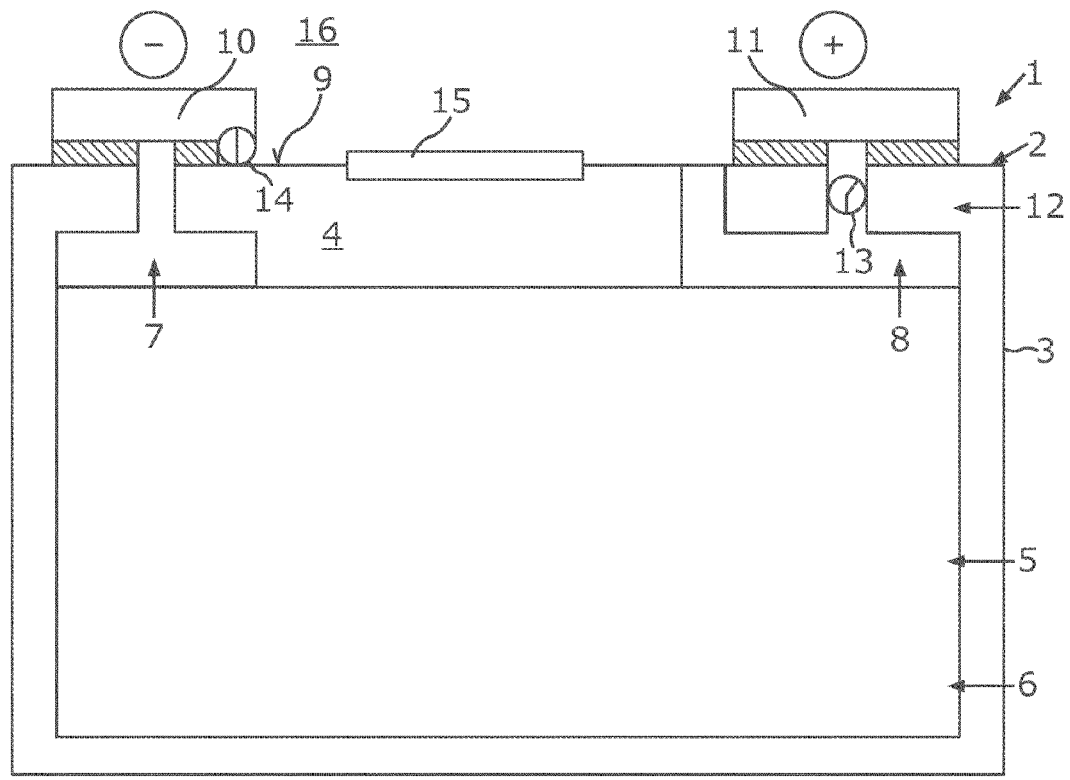
FIG. 3 is a schematic sectional view of the storage device according to the first embodiment, which is in a second state of the critical variation of the condition.
Figure 4:
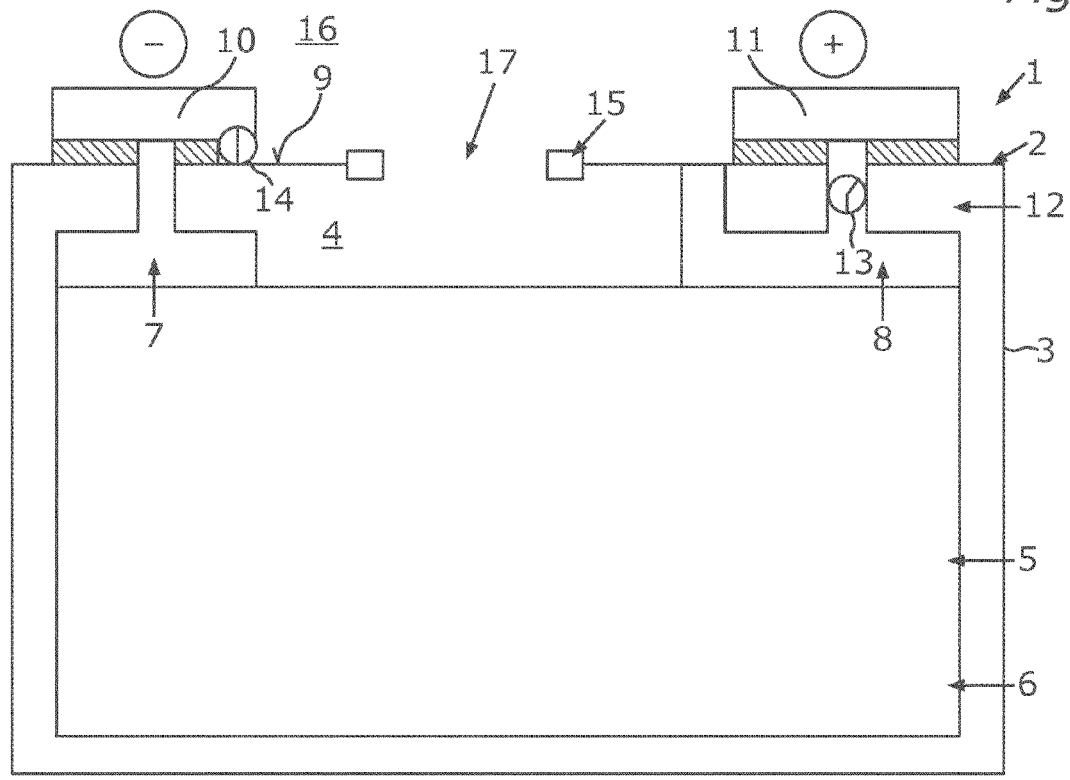
FIG. 4 is a schematic section view of the storage device according to the first embodiment, which is in a third state of the critical variation of the condition.

The safety devices are now designed to change from a respective deactivated state to a respective activated state one after the other during a critical variation of the condition of the storage cell 2 illustrated using FIGS. 2 to 4. In other words, in the context of the aforementioned method, it is provided that the safety devices are activated one after the other, i.e. successively and thus sequentially, during the critical variation of the condition, in order, for example, to activate thermal propagation in the storage housing in a cost-effective manner.

FIG. 1 shows the aforementioned normal operation of the storage cell 2, wherein the normal operation is a normal state. In normal operation or in the normal state, the safety devices are in their deactivated state, i.e. are not yet activated.

In normal operation or during normal operation, a pressure in the receiving chamber 4, also known as an internal pressure, is located in a normal range. If, for example, there is a thermal event in the storage cell 2, then the fluid is released in the receiving chamber 4, for example, whereby the internal pressure, which is also called the cell internal pressure, increases. If the internal pressure increases, for example, in such a way that the internal pressure leaves its normal range, for example, the aforementioned critical variation of the condition of the storage cell 2 begins, and the storage cell 2, for example, first comes into a first critical state of the critical variation of the condition illustrated in FIG. 2. For example, the thermal event results in a temperature of the storage cell 2, wherein said temperature is above a safety temperature. The temperature of the storage cell 2 results, for example, in the internal pressure having a value of about 6 bar and lying, for example, in a range of 5.5 bar to 6.5 bar. Owing to said internal pressure, the separating device 13 is activated first, i.e. is changed from the deactivated state to the activated state, while the short-circuit device 14 and the degassing device 15 remain in the deactivated state, i.e. are not activated. Due to this activation of the separating device 13, the storage cell 2 is disconnected from the circuit that is also referred to as the storage circuit.

If, for example, the internal pressure increases further in the course of the critical variation of the condition, so that the internal pressure, for example, is approximately 7.5 bar or in a range of 7 to 8 bar, then the storage cell 2, for example, changes to a second critical state of the critical variation of the condition that is illustrated in FIG. 3. This internal pressure then activates the short-circuit device 14, i.e. changes the short-circuit device 14 from the deactivated state to the activated state, while the degassing device 15 is not activated, in particular while the previously activated separating device 13 remains activated. Activating the short-circuit device 14, in particular while the separating device 13 is activated, causes an external short-circuit.

If the internal pressure rises further, so that the internal pressure is, for example, about 10 bar or in a range of 9.5 to 10.5 bar, the storage cell 2 changes to a critical state of the critical variation of the condition that is illustrated in FIG. 4. The degassing device 15 is activated by this internal pressure—in particular while the separating device 13 and the short-circuit device 14 are activated or remain activated. Owing to this activation of the degassing device 15, the degassing device 15, for example, releases an outlet opening formed in particular as a through opening 17, which is in particular formed in the cell housing 3. At least some of the fluid initially accommodated in the receiving chamber 4 can flow out of the receiving chamber 4 via the outlet opening 17, in particular into the surroundings 16. In other words, the internal pressure, when this reaches a range of 9.5 to 10.5 bar, opens the degassing device 15, also referred to as the degassing unit. As a result, for example, thermal propagation in the module mentioned can be avoided, so that, for example, the other storage cells are not brought into critical states by the storage cell 2. Thus, an escalation of the criticality level of the safety state of the storage device 1 can be avoided. In particular, the premature escape of fire and flame from the storage device 1 can be avoided, so that a particularly high safety level can be exhibited.

Figure 5:
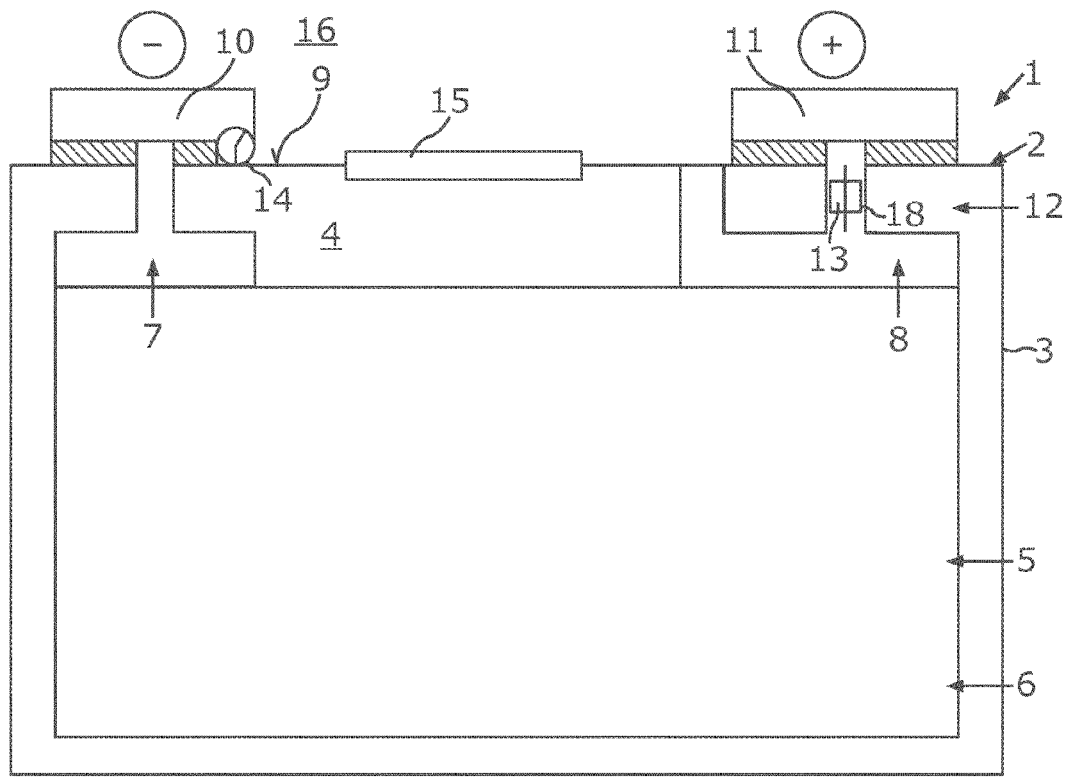
FIG. 5 is a schematic sectional view of a storage device according to the invention as claimed in a second embodiment, which is in normal operation.
Figure 6:
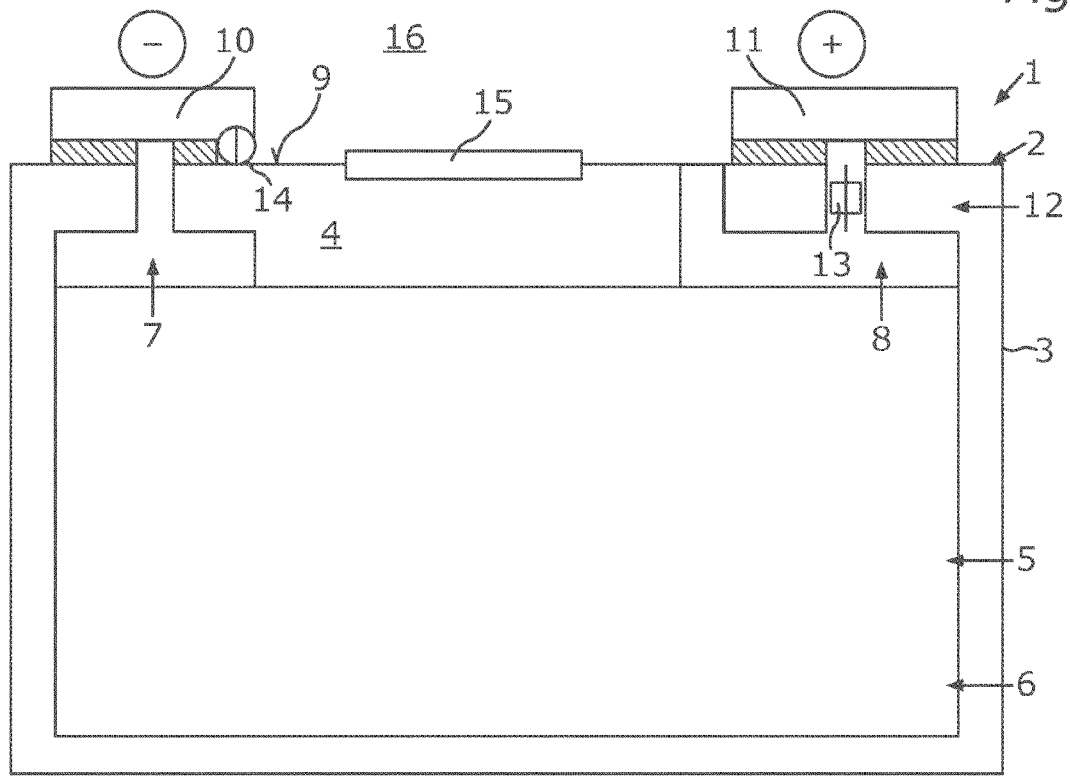
FIG. 6 is a schematic sectional view of the storage device according to the second embodiment, which is in a first state of a critical variation of the condition.
Figure 7:
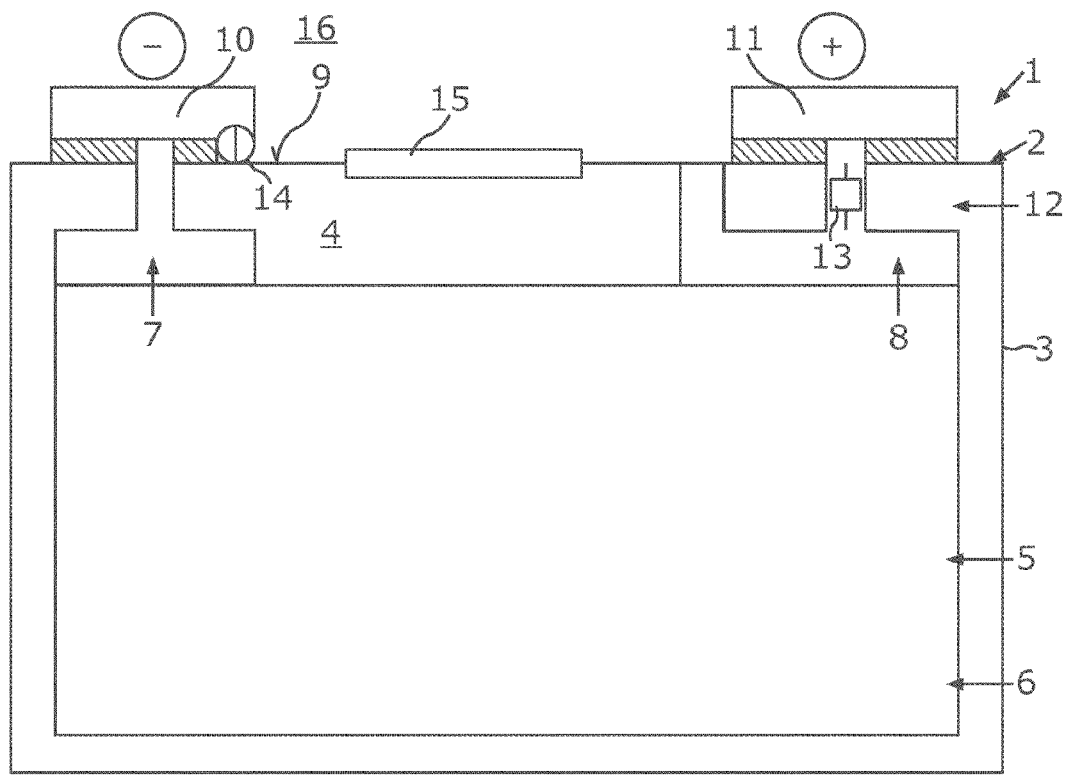
FIG. 7 is a schematic sectional view of the storage device according to the second embodiment, which is in a second state of the critical variation of the condition.
Figure 8:
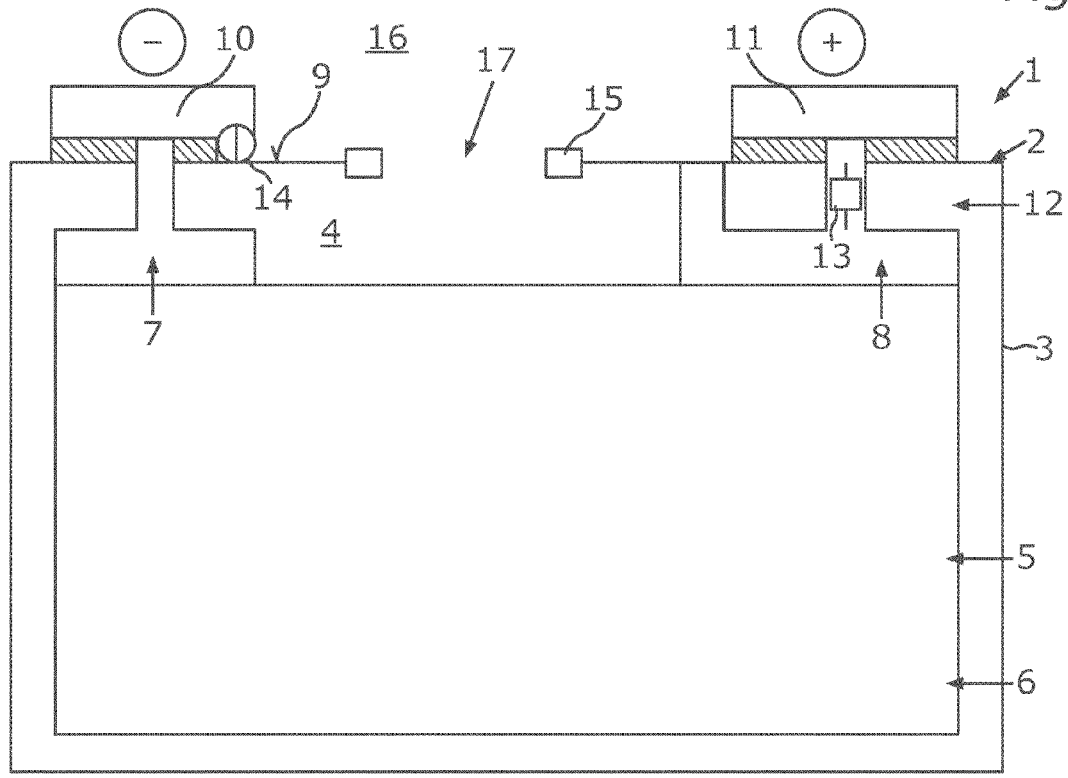
FIG. 8 is a schematic sectional view of the storage device according to the second embodiment, which is in a third state of the critical variation of the condition.

FIGS. 5 through 8 show a second embodiment of the storage device 1. FIG. 5 shows the second embodiment in a normal state, FIG. 6 shows a first state of a critical variation of the condition, FIG. 7 shows a second state and FIG. 8 shows a third state of the critical variation of the condition of the storage device 1, in particular the storage cell 2. In the second, the storage device 1 comprises the storage cell 2 and the other storage cells, which are also referred to as further storage cells and are, for example, adjacent to the storage cell 2. The further storage cells are connected, for example, to each other and/or to the storage cell 2 in parallel.

In the second embodiment, the separating device 13 comprises a melting fuse 18 or is designed as a melting fuse 18. In the second embodiment, the following switching order is now provided: If, for example, the internal pressure exceeds a predetermined threshold value, the short-circuit device 14 is activated first, whereby the storage cell 2 and all the adjacent further, parallel connected storage cells are short-circuited by means of the separating device 13, in particular by means of the melting fuse 18. The short-circuit device 14 is activated, for example, at a pressure that is in a range of 5.5 bar to 6.5 bar inclusive. The separating device 13, in particular the melting fuse 18, is activated a few milliseconds, in particular not more than 100 milliseconds or less than 100 milliseconds, after activating the short-circuit device 14 or after the short-circuiting of the storage cell 2 and the further parallel connected storage cells, whereby at least the storage cell 2 is disconnected from the circuit.

As a result of the short-circuiting of the storage cell 2 and the further storage cells by means of the melting fuse 18, the melting fuse is heated, so that the melting fuse melts. Thus, the melting fuse disconnects at least the storage cell 2 from the circuit owing to the temperature. Subsequently, as described above for example, the degassing device 15 is activated, whereby the receiving chamber 4 is degassed.

Figure 9:
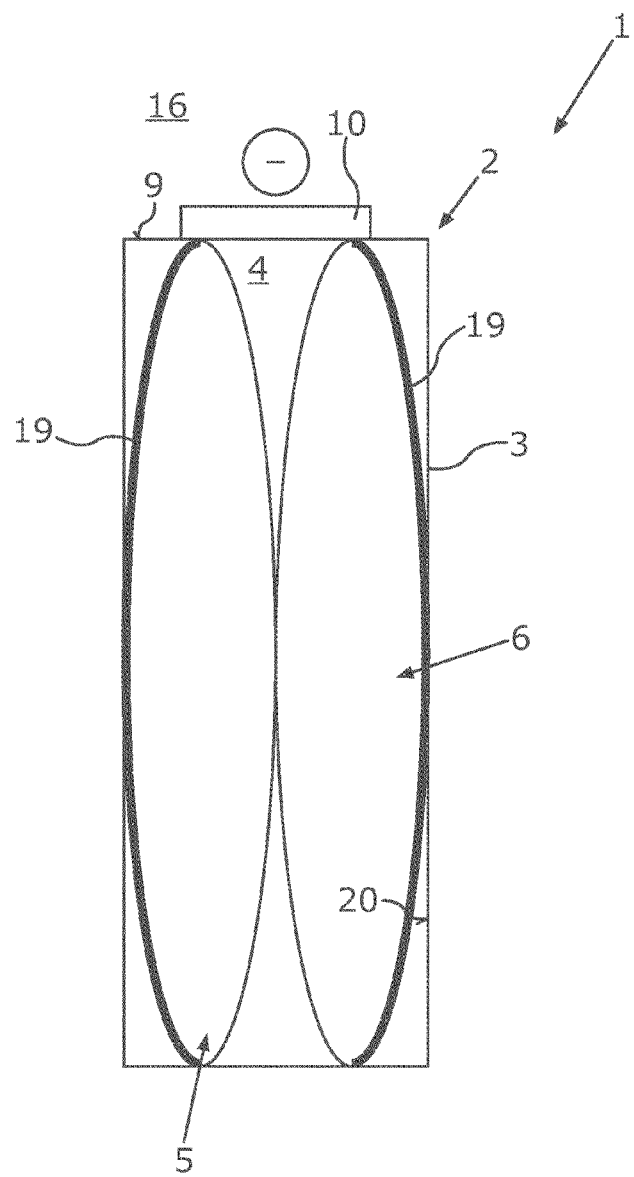
FIG. 9 is a schematic cross-sectional view of a storage device according to the invention and as claimed in a third embodiment.

FIG. 9 shows a third embodiment. As described below, in the third embodiment as in the first and second embodiments, a solution or a measure is provided within the storage cell 2, wherein by means of the measure the reaction time for producing a short-circuit can be kept particularly low. This measure comprises a polymer-coated copper foil 19, which is electrically connected to the connection 10 and thus to the electrical minus pole. The copper foil 19 is arranged between the electrode device 6, in particular between at least one electrode winding or an electrode stack of the electrode device 6, and an inner side 20 of the cell housing facing the receiving chamber 4 and contacts, for example, the electrode device 6 on the one hand and the inner side 20 and thus the cell housing 3 on the other hand.

If the copper foil 19 is exposed to abnormal heat, i.e. abnormally high heat, such as that occurs, for example, in a thermal event, at least the polymer coating of the copper foil 19 melts, thereby creating a short circuit between the copper foil 19 and cell housing 3. The copper foil 19 thus acts as a short-circuit trigger, which is arranged at a heat transfer point between two cells or between the electrode device 6 and the cell housing 20. This allows the reaction time to cause the short circuit to be kept particularly short.

Furthermore, a fourth embodiment that is not specially shown in the figure can be provided, which corresponds to the first embodiment, at least with the difference that the separating device 13 and/or the short-circuit device 14 does not change from the deactivated state to the activated state based on pressure but based on temperature. For this purpose, the separating device 13 or the short-circuit device 14 includes, for example, at least one bimetal, in particular a bimetallic short-circuit trigger, which, for example, is deformed automatically or independently in the event of a temperature increase in such a way that the storage cell 2 is disconnected from the circuit or the short circuit is deformed. In this case, for example, the separating device 13 or the short-circuit device 14 has an activation temperature at which the separating device 13 or the short-circuit device 14 is activated. For example, this activation temperature is 100 degrees Celsius. Owing to this temperature-based activation of the separating device 13 or the short-circuit device 14, the reaction time in the case of a thermal event can be kept particularly short.

REFERENCE CHARACTER LIST

1 Storage device
2 Storage cell
3 Cell housing
4 Receiving chamber
5 Storage element
6 Electrode device
7 Electrode tongue
8 Electrode tongue
9 Outside
10 Connection
11 Connection
12 Safety apparatus
13 Separating device
14 Short-circuit device
15 Degassing device
16 Surroundings
17 Outlet
18 Melting fuse
19 Polymer-coated copper foil
20 Inside The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage device for storing electrical energy, comprising:
   at least one storage cell having a cell housing, a receiving chamber delimited by the cell housing, and at least one storage element accommodated in the receiving chamber for storing electrical energy; and
   a safety device, wherein
   the safety device includes a separating device as a first safety device that disconnects at least the storage cell from a circuit of the storage device, a short-circuit device as a second safety device that causes a short circuit at least of the storage cell, and a degassing device as a third safety device that degasses the receiving chamber, the first, second and third safety devices are designed to be activated sequentially from a respective deactivated state to a respective activated state during a critical variation of a condition of the storage cell, and the safety device is configured to ensure that the separating device, then the short-circuit device and then the degassing device change from the respective deactivated state to the respective activated state during the critical variation of the condition.

2. The storage device according to claim 1, wherein the respective safety devices are changed from the respective deactivated state to the respective activated state by a respective pressure prevailing in the receiving chamber.

3. The storage device according to claim 2, wherein with the pressure prevailing in the receiving chamber increasing during the critical variation of the condition, first the separating device, then the short-circuit device and then the degassing device change from the respective deactivated state to the respective activated state.

4. The storage device according to claim 1, wherein
the separating device changes from the deactivated state to the activated state at a pressure prevailing in the receiving chamber in a range of 5.5 bar to 6.5 bar.

5. The storage device according to claim 1, wherein
the short-circuit device changes from the deactivated state to the activated state at a pressure prevailing in the receiving chamber in a range from 7 bar to 8 bar.

6. The storage device according to claim 1, wherein
the degassing device changes from the deactivated state to the activated state at a pressure prevailing in the receiving chamber in a range from 9.5 bar to 10.5 bar.

7. The storage device according to claim 1, wherein
the short-circuit device is changed from the deactivated state to the activated state by a temperature prevailing in the receiving chamber.

8. The storage device according to claim 1, wherein
the storage device comprises at least one further storage cell connected in parallel to the storage cell for storing electrical energy, and the short-circuit device is designed to short-circuit at least the first storage cell and the parallel connected further storage cell.

9. A motor vehicle, comprising at least one storage device according to claim 1.

* * * * *